US006884492B2

(12) United States Patent
Basler et al.

(10) Patent No.: US 6,884,492 B2
(45) Date of Patent: Apr. 26, 2005

(54) ROLL OF TISSUE PAPER SHEETS, AND ASSOCIATED MANUFACTURING METHOD

(75) Inventors: Michel Basler, Issenheim (FR); Sébastien Jeannot, Colmar (FR); Pierre Laurent, Turckheim (FR)

(73) Assignee: Georgia-Pacific France, Kunheim (FR)

( * ) Notice: Subject to any disclaimer, the term of this patent is extended or adjusted under 35 U.S.C. 154(b) by 47 days.

(21) Appl. No.: 10/636,531

(22) Filed: Aug. 8, 2003

(65) Prior Publication Data

US 2004/0074594 A1 Apr. 22, 2004

(30) Foreign Application Priority Data

Aug. 22, 2002 (EP) ........................................... 02018776

(51) Int. Cl.$^{7}$ .............................. B32B 3/00; B31F 1/22; D21H 11/00

(52) U.S. Cl. ....................... 428/172; 428/166; 428/192; 428/215; 428/906; 162/109; 162/118; 156/209

(58) Field of Search ......................... 428/172, 43, 166, 428/192, 213, 215, 906; 162/109, 118; 156/209, 553, 555

(56) References Cited

U.S. PATENT DOCUMENTS 4,726,977 A * 2/1988 Goldstein et al. ........... 428/138
5,354,614 A * 10/1994 Cox et al. .................. 428/343

* cited by examiner

*Primary Examiner*—Donald J. Loney
(74) *Attorney, Agent, or Firm*—Breiner & Breiner, L.L.C.

(57) ABSTRACT

The invention relates to a roll constituted by a plurality of tissue paper sheets each having a specific surface weight between 10 and 40 g/m$^2$ and exhibiting thick zones (4) separated over at least 90% of their periphery by thinner zones (5). According to the invention, and as regards at least the outermost turns of the roll, the thick zones are at least partly superposed one on the other in a way to add the thicknesses cumulatively and hence to create height differentials on the roll's outside. The invention also relates to a method for making a roll, wherein a strip composed of a plurality of juxtaposed tissue paper sheets exhibiting thick zones separated by thinner zones will be wound on itself. According to the invention, the winding of the roll is such that the thick zones (4) of the outermost roll turns are at least partly superposed in order to constitute a salient topography on the roll's outside.

24 Claims, 4 Drawing Sheets

INVENTION

ROLL OF TISSUE PAPER SHEETS, AND ASSOCIATED MANUFACTURING METHOD

The present invention relates to the field of absorbent paper for sanitary or household uses, more specifically tissue paper products and rolls made of absorbent paper, as well as to their manufacturing method.

Sanitary paper or paper towels, for example, are preferred embodiments of the present invention.

In particular, the invention concerns rolls of absorbent paper based on cellulose cotton, hereafter tissue paper, which exhibit thick zones separated by thinner zones.

A known procedure for imparting thickness and a salient topography to such sheets is in the form of embossing.

Such embossing is carried out on a low moisture sheet of paper, that is in the so-called dry part of the apparatus situated downstream of the wet part as seen in relation to a manufacturing process for the sheet of paper.

The present invention relates to making a roll once an embossed sheet of paper has entered the dry portion of the apparatus.

The embossing procedure allows local and permanent deformation of a ply which is part of a sheet, that is to manufacture protrusions on one side which correspond to depressions on the other.

Combining two plies in a way that their protrusions mutually touch is part of the so-called "tip-to-tip" technique whereas combining them so that the protrusions of one ply nest in the depression zones of the other ply is called "nesting".

Either way, the plies always are embossed at a given repeat of the protrusions, and at a height and shape matching the design of the final product. These parameters affect in particular the final sheet thickness, its softness, flexibility, its absorptivity and its aesthetics.

Moreover, the thickness of a sheet of tissue paper may be based on other factors, such as superposing a larger number of plies, for example 3 or 4 plies. However, this technique entails limitations regarding ply assembly. Practically, no more than 4 plies can be combined to form an appropriate sheet of tissue paper.

Another way to add bulk to, or increase the thickness of a tissue paper-based sheet is to manufacture it by the Through Air Drying (TAD) technique.

These various techniques therefore allow imparting bulk and/or imparting a particular appearance to each of the sheets composing a roll. However, the outer appearance of the roll does not per se show the bulk imparted to each sheet. FIG. 1 illustrates a prior art roll based on sheets each fitted with a salient topography. The outer appearance of such rolls is fairly flat, lacking a salient topography or specific bulk, and therefore appealing little to the consumer.

This condition derives from conventional rolls being subjected during winding to such stresses that the patterns more or less are crushed and therefore not perceptible from a distance.

Such a product is perceived by the consumer as being commonplace, of average class, and such a consumer then may well select another product.

Also, U.S. Pat. No. 4,339,088 is known which describes a procedure for making a roll of absorbent sheets which are shaped in a way that the mutual nesting of the sheets is precluded over the full winding length of the roll. This feature of course fails to impart any salients to the roll per se. This mutual nesting of the sheets' salient topography is considered undesirable by the expert because it hampers proper winding of the product.

In novel and unexpected manner, it was discovered that the external appearance of a roll of absorbent sheets of tissue paper may be substantially improved thanks to specific technical features linked to the roll's constitution.

Accordingly, one object of the present invention is to impart a marked salient topography to the outside of a roll before the roll is put to use.

Therefore the object of the present invention is a roll consisting of a plurality of tissue paper sheets each comprising at least one ply, the specific surface weight of each of the plies being between 10 and 40 g/m$^2$ and the sheets exhibiting thick zones separated over at least 90% of their periphery by thinner zones.

In the invention and at least across the most external turns of the roll, the thick zones are at least partly superposed in order to attain cumulative thickness and to create height differences at least outside the roll.

In this manner, by superposing thick zones on other zones of the same kind, in particular at the last turns of the rolls, salient topographical zones are implemented externally on the roll which are clearly visible at distances of several meters.

More specifically, in the invention, the thickness differential between thick zones and thinner zones of the sheets is at least 10%, preferably at least 20%.

Therefore, considering the relative configuration of the sheets constituting the last turns of the roll, a significant height differential H is attained over the visible (external) roll surface between the salient topographical zones and the depression zones.

In one embodiment of the present invention, the thick zones of the sheets are embossed.

In a particular embodiment of the present invention, at least 50% of the thick zones of the sheets are shaped by micro-embossing at least one ply, the micro-embossing consisting of a group of protrusions of a surface density of at least 30 tips/cm$^2$, the area of the tips at their top being between 0.03 mm$^2$ and 2 mm$^2$.

The sheet's thick and thinner zones together define at least one pattern.

Advantageously the pitch P in the direction of machine advance is such that NP=πD where N is an integer other than 0 and preferably larger than 1 and where D is the outside diameter of the roll.

The pattern pitch P in the direction of machine advance is the smallest distance in the direction of sheet advance in the production machine wherein the pattern is identically reproduced.

By implementing on one hand specific patterns and selecting on the other hand the pitch P as claimed, a novel and unexpected visual effect is produced.

In an additional feature of the present invention, the thick zones are spaced from one another by a distance larger than 2 mm and preferable larger than 4 mm.

More specifically, the thinner zones may be unembossed or consist of protrusions of which the height is less by at least 10% than the protrusion height of the thick zones.

Also, the areas of the thick zones preferably are larger than 2 cm$^2$.

These features, whether considered singly or in combination, allow creating a salient topography on the outside of the roll, having visual effects enabling enhanced perceptions of thickness, of comfort, even absorptivity, of the product.

Without transcending the scope of the present invention, the thick zones are bounded by elements which are linear or not and of a thickness exceeding that of the thick zones.

Illustratively, pads or quilt-like structures or any other pattern of which the salient topography is well visible on the outside of the roll may be formed.

A particular embodiment of the present invention relates to a roll of which the sheets comprise at least two plies, namely a first ply which is embossed and a second ply which is not, the first ply being visible from outside the roll.

Another embodiment of the invention relates to a roll of which the sheets comprise at least two plies each differently embossed. In particular the ply not visible from the outside may be micro-embossed across its full surface.

A roll of the invention may consist of a plurality of tissue paper sheets each of at least one ply, the specific surface weight of each ply being between 10 and 40 g/m$^2$ and exhibiting height differentials H at least on the roll outside and constituted by salient surface zones, the zones being between 3 and 20 cm$^2$ and being separated from one another over at least 90% of their periphery by zones of depressions.

In illustrative manner, the height differentials H between the salient and depression zones are at least 0.2 mm, preferably at least 0.4 mm.

Furthermore the invention relates to a method for manufacturing a roll, whereby a strip consisting of a plurality of juxtaposed tissue paper sheets is wound on itself, the sheets being fitted with thick zones that are separated by thinner zones.

In one feature of the present invention, the winding is such that the sheets comprising thick zones separated by thinner zones are superposed at least partly on each other.

Within the scope of the present invention, the thick zones are partly superposed when at least 80% and preferably 90% of the surface of a thick zone of the most external turn covers a thick zone of the nearest turn.

As already discussed above, the set of the thick zones and of the thinner zones of the sheets define at least one pattern of a salient topography.

Advantageously a pitch P in the direction of advance of the pattern is determined in a way that NP=πD, where N is an integer different from 0 and preferably larger than 1 and where D is the outside diameter of the roll.

In particular the roll consists of sheets comprising at least two plies that are configured in the tip-to-tip mode.

In one particular embodiment of the present invention, the roll consists of sheets of at least two embossed plies of which one at least is embossed, the plies illustratively being combined by glueing.

Moreover, the plies may be embossed separately with different embossing patterns.

Without transcending the scope of the present invention, the method also may include pre-embossing at least the sheet's plies with a uniform micro-embossing pattern and then in embossing the ply to manufacture the thinner zones. Illustratively the micro-embossed ply may contain over all or part of its surface at least 30 protrusions per cm$^2$.

Other features, advantages and details of the invention are elucidated in the description below which is illustrative and does not imply limitation and in reference to the attached drawings:

FIG. 2 shows the theoretical configuration of sheets which are part of a roll of the present invention, in particular near the outermost turns of the roll.

In such a configuration, the thicknesses of the thick zones 4 are cumulative whereas the thinner zones 5 remain mutually apart.

Figure 2:
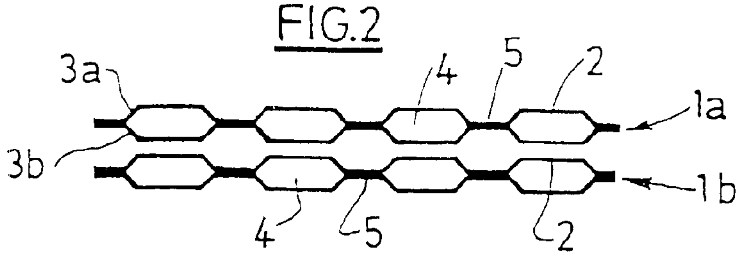
FIG. 2 is a diagram showing the theoretical superposition of two sheets of the invention.

More specifically FIG. 2 shows a cross-section of two sheets that may be part of a roll of the invention. Each sheet 1*a,* 1*b* in this instance consists of thick zones 4 having an area illustratively between 3 and 20 cm$^2$ that are separated by thinner zones 5. The thick zones 4 are separated from each other by a distance of at least 2 mm. This thickness differential between two types of zones is at least 10%. This thickness differential on each sheet illustratively may be detected using a micrometer that applies a pressure of 20 g/cm$^2$ to a sample for 5 seconds. In this manner a thick zone 4 and a thinner zone 5 shall be measured consecutively to infer their thickness differential.

Another way to measure this thickness differential makes use of contactless topographical apparatus (such as MICRO-TOP made by Eotech Co.) allowing determination of the contour of each sheet's sides.

Figure 3:
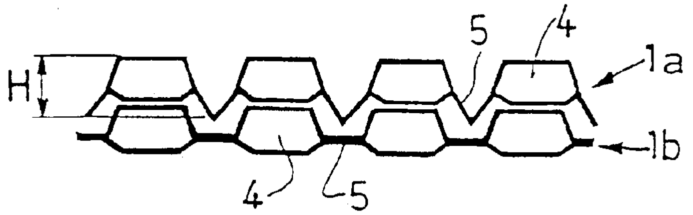
FIG. 3 is a diagram of the same kind as in FIG. 2 showing the sheet configuration of the roll.
Figure 6:
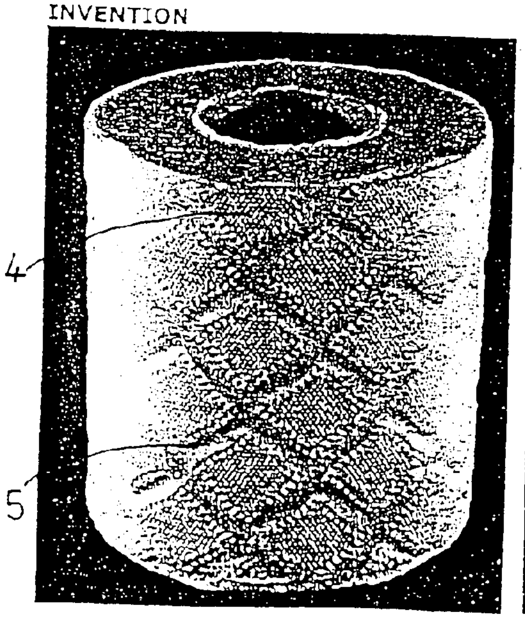
FIG. 6 is a photo of a roll made according to the present invention.
Figure 1:
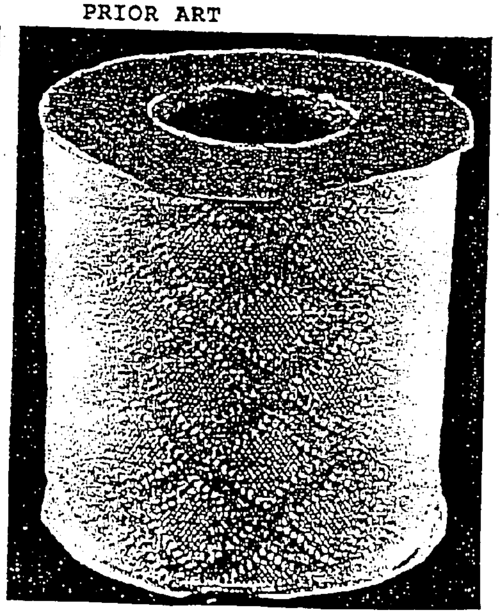
FIG.1 PRIOR ART
FIG. 1 is a photograph of a roll of the prior art.

In practice, that is as regards the last turns of a roll of the invention, the superposition of two sheets 1*a,* 1*b* may resemble the combination shown in FIG. 3. In this case the thick zones 4 make contact while being slightly warped, whereas the thinner zones 5 of the first sheet (visible from outside the roll) are warped and almost make contact with the thinner zones 5 of the second sheet 1*b* (not visible from outside the roll). Such sagging of the outer thinner zones is mainly due to the constraints imparted to the sheet when it is being wound: a traction is exerted on the sheet in order to attain a finished roll that shall tightly stay together. In this manner a height differential H is created which for example is roughly a half mm and which allows making a salient topography that is visible from afar as shown in FIG. 6. In this manner a salients/depressions effect has been attained.

Figure 4:
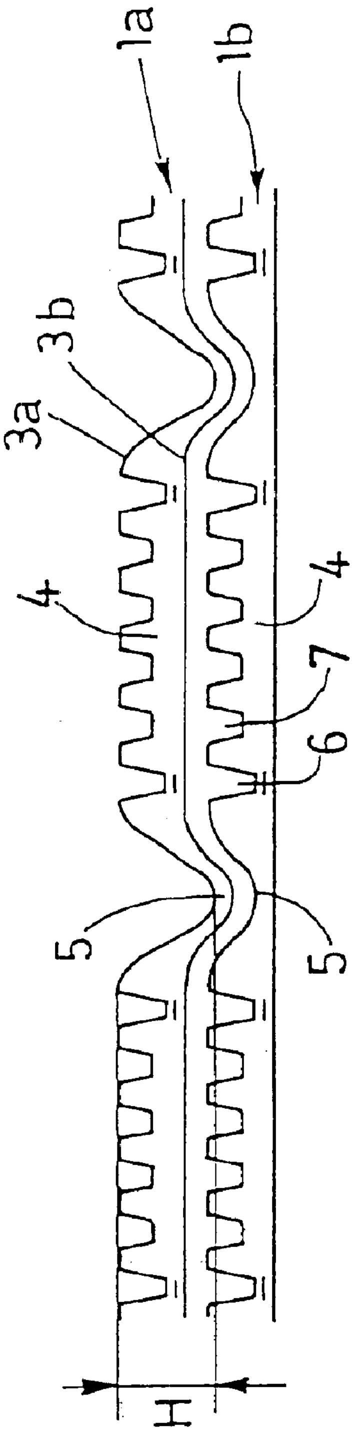
FIG. 4 is a diagram of another embodiment of the invention.
Figure 5:
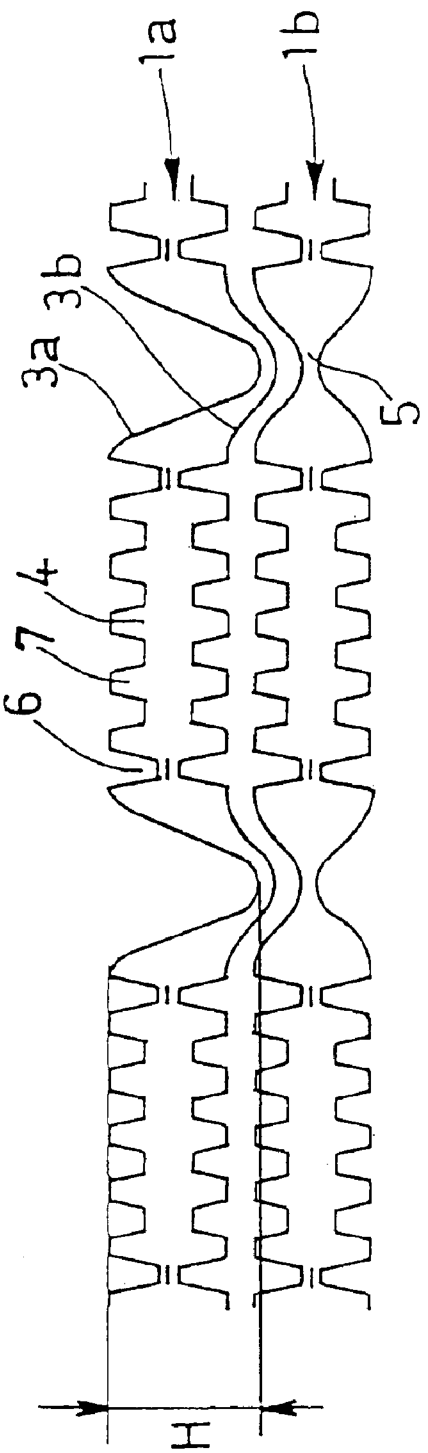
FIG. 5 illustrates another embodiment of the invention.

As shown in FIGS. 3, 4 and 5, the height differential H is the distance between the top of the thick zone 4 and the bottom of the thin zone 5 in the region of the roll's outermost turn, namely that which is accessible to viewing by an observer.

Figure 7:
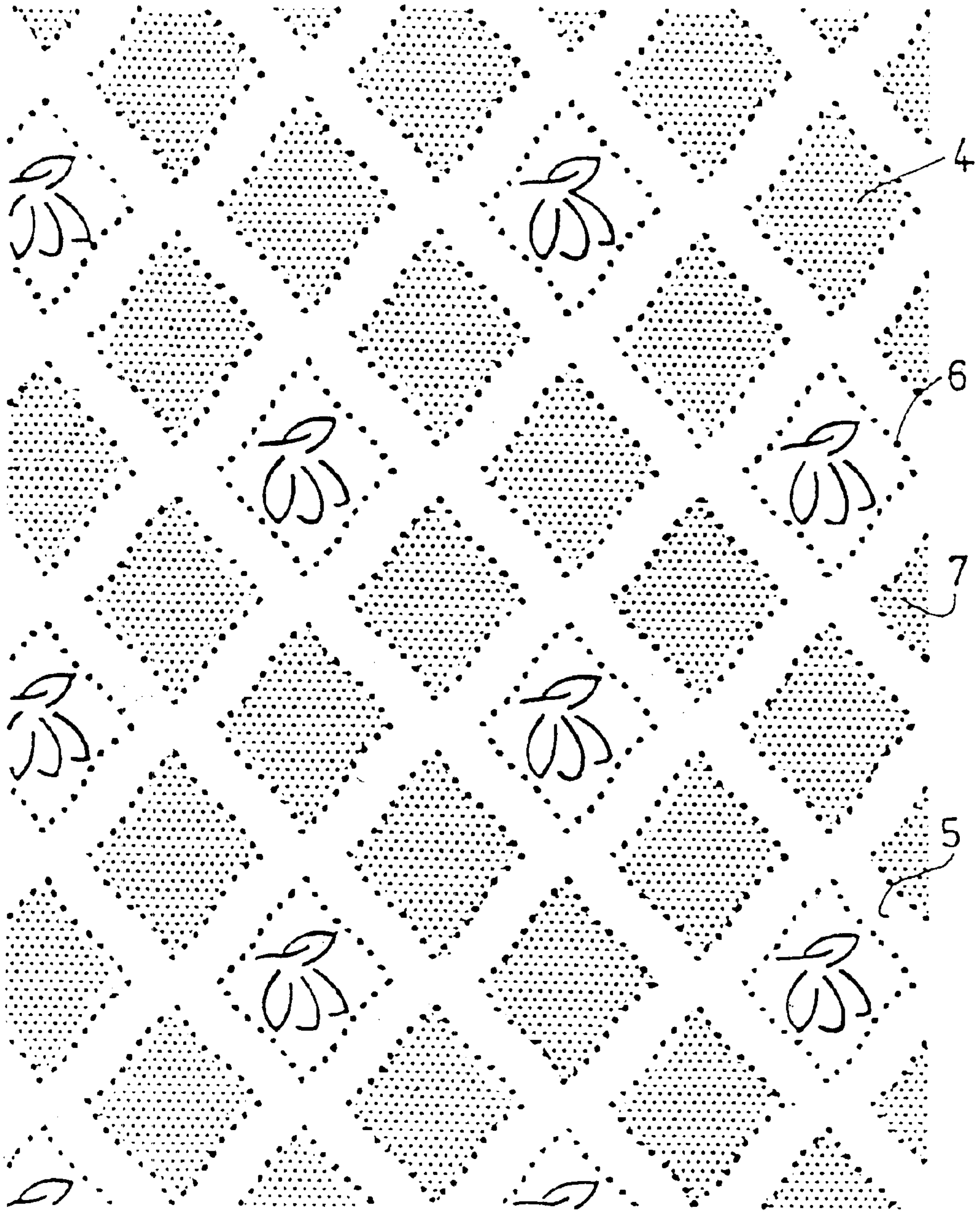
FIG. 7 is a drawing of an embossing pattern of a sheet which is part of a roll of the present invention.
Figure 8:
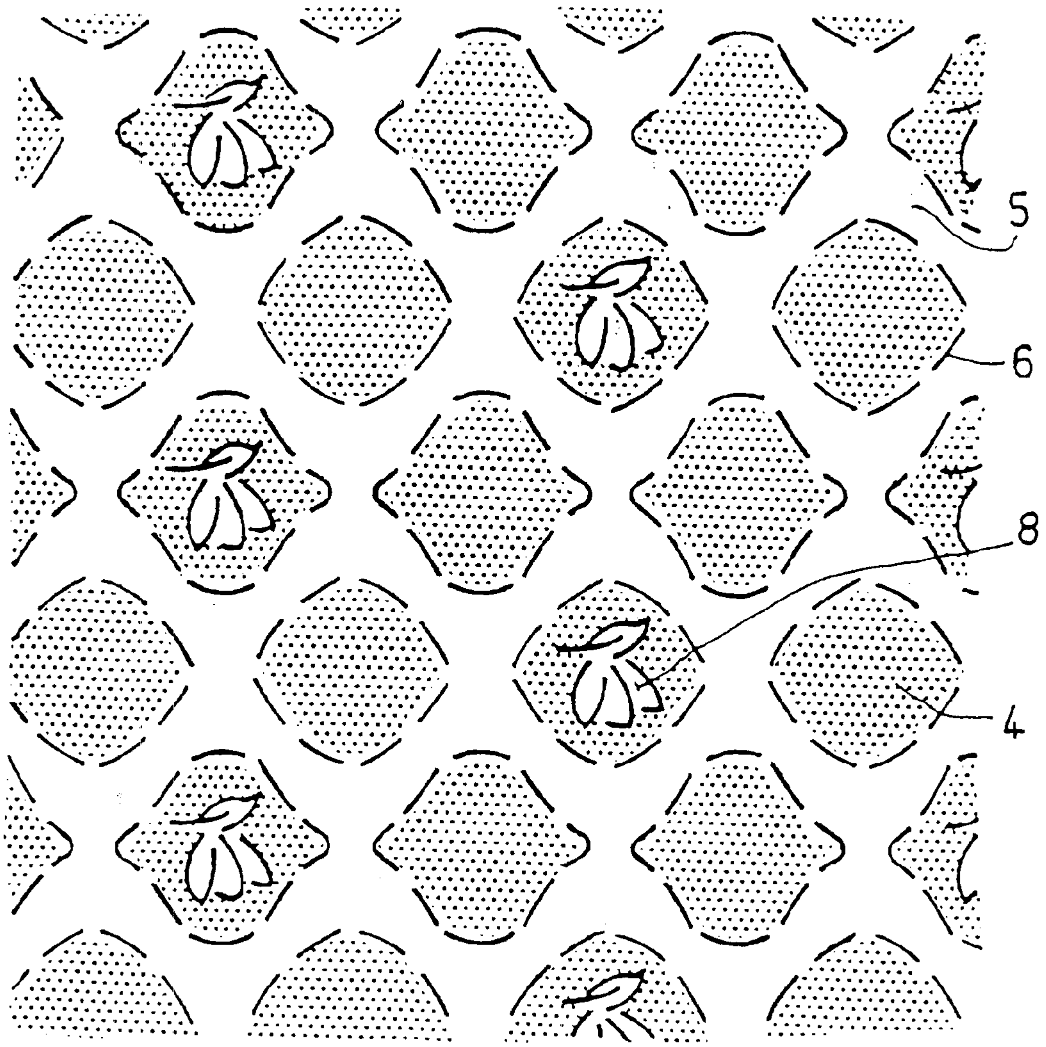
FIG. 8 is a drawing of another embossing pattern of a sheet included in a roll of the present invention.

FIG. 4 relates to another embodiment of the invention according to which each sheet consists of two plies, the outer ply 3*a* being embossed and the inside ply 3*b* being smooth or non-embossed. The thick zones 4 consists of micro-embossings on the outside ply 1*a* having a tip density larger than 30 tips/cm$^2$. The thick zones 4 are bounded by protrusions of a larger diameter 6 or by linear protrusions of equal depth or preferably larger than the other protrusions forming the micro-embossing. The two plies may be combined by adhesive bonding at the large protrusions. FIGS. 7 and 8 show examples of such an embossed pattern.

The two sheets 1*a,* 1*b* are configured as shown in FIG. 4, that is, their thick zones 4 being superposed, and also their thinner zones 5. The embossing protrusions may be identical or not. A significant height differential H is easily implemented which offers a special effect on the outside of the roll.

The salient topography of the invention may be attained only under given conditions: the illustratively embossed thick zones 4 are enclosed by thinner zones 5 over most of their periphery, that is over at least 90% of their periphery.

Moreover, the thick zones 4 must be spaced a given distance from each other, for example at least 2 mm, preferably 4 mm.

Also the pitch P in the direction of advance of the salient pattern is linked to the roll's outside diameter D by the relation $NP=\pi D$, where N is an integer other than zero and preferably larger than 1.

Accordingly there are several superposition zones in a roll that meet the equation depending on the value of N.

Illustratively, the pitch P in the direction of advance of the pattern may be about 5 to 6 cm.

Advantageously the thick zones exhibit an area larger than 2 $cm^2$, for example between 3 and 20 $cm^2$. They may be in the form of micro-embossing(s), that is a set of protrusions of a surface density at least of 30 tips/$cm^2$ and illustratively having an area at their tops between 0.03 and 2 $mm^2$.

FIG. 5 illustrates another embodiment of the present invention according to which the most external turns of the roll consist of sheets 1*a,* 1*b* each fitted with two embossed plies 3*a,* 3*b.*

In this design, the two plies 3*a,* 3*b* are configured in a manner that their particular protrusions shall make contact with each other (tip-to-tip). As a result a height differential H which is clearly visible from outside the roll is present on the last turn. Obviously too, the height differential H shall be considered being an average value because manufacturing deviations may entail slight difference in H on the roll.

Any known system may be used to measure if required the height differential H on the outside of the roll, for example image analysis carried out on a photograph of the roll's "peak" or topography entailing or not contact.

A digital camera may be used for such purposes to visualize the profile of the roll's peak, the roll being illuminated in glancing manner. Once the profile has been stored in a computer, and using special software, the height differentials H between the "top" of the thick zones and the "bottom" of the thinner zones may be measured.

The sheets of the invention may each consist of several plies exhibiting different physical properties such as specific surface weight, elongation rate, thickness, etc. without thereby transcending the scope of the present invention.

The methods for making the plies 3*a,* 3*b* that constitute the sheets 1*a,* 1*b* may be known per se, for example by the Conventional Wet Press (CWP)/standard procedure with drying on a heated cylinder, the Through Air Drying (TAD)/ method of drying by blowing air. Within the scope of the invention, plies made by different procedures also may be combined.

The photograph of FIG. 7 shows an embodiment displaying diamond-shaped, micro-embossed thick zones 4 bounded by elements 6 such as tips of greater depth. The thinner zones 5 separate the zones 4. Therefore the zones 5 subtend a spacing between the zones 4. It is said spacing, which is involved in particular in the superposition of the most outward turns of the roll, that makes it possible to attain the salient topography of the invention.

As shown in FIG. 8, the thick zones 4 may comprise linear protrusions 8 and also a combination of linear protrusions 8 and micro-embossing. As regards the photograph of FIG. 8, the elements 6 bounding the thick zones 4, which consist substantially of micro-embossing, may be constituted of linear protrusions of greater depth.

Obviously too, any kind of pattern inside a thick zone 4 is conceivable.

Within the scope of the present invention, the thinner zones 5 may be smooth, lacking any protrusions, however they also may consist of protrusions imparting little thickness to the product. Preferably their thickness shall be the thickness of the initial material.

One way of making this kind of product may include pre-embossing one or more plies using micro-embossing and then "crushing" or embossing or knurling some zones that in this manner shall become thinner zones 5.

Another embodiment of the present invention may be creating, using any known means, thinner zones on a thick product such as a sheet comprising 3 or 4 plies or of a TAD-type already defined above.

With respect to assembling different plies constituting a cellulose cotton, i.e., tissue paper sheet, several approaches known per se may be used, for example glueing, knurling, cold or hot marking.

Preferably the plies are adhesively bonded at the highest protrusions bounding the thick zones. In this implementation, the plies may be combined using a joining cylinder or the tip-to-tip procedure.

The thick zones 4 are not mandatorily separated from each other over their full periphery by the thinner zones. They may be "connected" to other thick zones. Therefore the thick zones shall be surrounded over at least 90% of their periphery by thin zones 5.

It is claimed:

1. A roll comprising a plurality of tissue paper sheets, each sheet comprising at least one ply having a specific surface weight of between 10 and 40 g/$m^2$, the sheets including over a periphery thereof thick zones which are separated over at least 90% of the periphery by thinner zones, wherein the thick zones are at least partly superposed one on another at least at outermost turns of the roll in a way that thicknesses of the thick zones add cumulatively and create height differentials H at least at an outside of the roll.

2. Roll as claimed in claim 1, wherein a height differential between a thick zone and a thinner zone of a sheet is at least 10%.

3. Roll as claimed in claim 1, wherein a height differential between a thick zone and a thinner zone of a sheet is at least 20%.

4. Roll as claimed in claim 1 or 2, wherein the thick zones of said sheets are embossed.

5. Roll as claimed in claim 1 or 2, wherein at least 50% of the thick zones include micro-embossing on at least one ply, said micro-embossing comprising a set of protrusions of a density of at least 30 tips/$cm^2$ and having an area at a top of each protrusion of between 0.03 $mm^2$ and 2 $mm^2$.

6. Roll as claimed in claim 1 or 2, wherein said thick zones and said thinner zones define at least one pattern of salient topography, having a pitch P in a direction of machine advance of said pattern is such manner that $NP=\pi D$ where N is an integer different from 0 and where D is an outside diameter of said roll.

7. Roll as claimed in claim 1 or 2, wherein said thick zones and said thinner zones define at least one pattern of salient topography, having a pitch P in a direction of machine advance of said pattern is such manner that $NP=\pi D$ where N is an integer greater than 1 and where D is an outside diameter of said roll.

8. Roll as claimed in claim 1 or 2, wherein the thick zones are spaced apart one from another by a distance larger than 2 mm.

9. Roll as claimed in claim 1 or 2, wherein the thick zones are spaced apart one from another by a distance larger than 4 mm.

10. Roll as claimed in claim 1 or 2, wherein the thinner zones are unembossed or include protrusions of a height less by at least 10% than height of protrusions forming the thick zones.

11. Roll as claimed in claim 1 or 2, wherein the thick zones have a surface larger than 2 $cm^2$.

12. Roll as claimed in claim 1 or 2, wherein the thick zones are delimited by elements which have a depth greater than the thickness of the thick zones.

13. Roll as claimed in claim 1 or 2, wherein the sheets comprise at least a first embossed ply and a second unembossed ply, said first ply being visible from outside the roll.

14. Roll comprising a plurality of tissue paper sheets, each sheet comprising at least one ply having a specific surface weight of between 10 and 40 $g/m^2$, said at least one ply having height differentials H at least on an outside of the roll, wherein said height differentials H are constituted by thick zones, with each thick zone having an area larger than 2 $cm^2$ and which are separated over at least 90% of a periphery by thinner zones.

15. Roll as claimed in claim 14, wherein said height differentials H between the thick zones and the thinner zones are at least 0.2 mm.

16. Roll as claimed in claim 14, wherein said height differentials H between the thick zones and the thinner zones are at least 0.4 mm.

17. A method for making a roll as claimed in claim 1 or 2, comprising winding a strip on itself, said strip comprising a plurality of juxtaposed tissue paper sheets which have thick zones separated over at least 90% of a periphery by thinner zones, wherein said winding is such that the thick zones of outermost roll turns are at least partly superposed.

18. Method as claimed in claim 17, wherein said tissue paper sheets have at least on one side thick zones separated by thinner zones and together define a salient topographical pattern having a pitch P in a direction of machine advance of said pattern where $NP=\pi D$, N being an integer other than zero and D is an outside diameter of the roll.

19. Method as claimed in claim 17 wherein the roll comprises sheets of at least two embossed plies and is configured in tip-to-tip pattern.

20. Method as claimed in claim 18 wherein the roll comprises sheets of at least two embossed plies and is configured in a tip-to-tip pattern.

21. Method as claimed in claim 13 wherein the roll comprises sheets formed by at least two plies, at least one of said plies being an embossed ply, and wherein the plies are combined by adhesive bonding.

22. Method as claimed in claim 21, wherein the plies are separately embossed into different embossing patterns.

23. Method as claimed in claim 17 further comprising pre-embossing at least one of the plies of said sheet using uniform micro-embossing and then embossing said ply to form said thinner zones.

24. Method as claimed in claim 23, wherein the micro-embossing provides at least 30 protrusions/$cm^2$ over all or part of a surface of said ply.

* * * * *